US010033869B2

(12) United States Patent
Southwick et al.

(10) Patent No.: US 10,033,869 B2
(45) Date of Patent: Jul. 24, 2018

(54) METHODS AND SYSTEMS FOR INFORMATION STREAMING TO USER INTERFACE

(75) Inventors: Richard Southwick, San Francisco, CA (US); Mathieu Lajugie, Redwood City, CA (US); Stephen Potenza, Sacramento, CA (US)

(73) Assignee: 8x8, Inc., San Jose, CA (US)

( * ) Notice: Subject to any disclaimer, the term of this patent is extended or adjusted under 35 U.S.C. 154(b) by 1994 days.

(21) Appl. No.: 12/201,726

(22) Filed: Aug. 29, 2008

(65) Prior Publication Data

US 2010/0057927 A1  Mar. 4, 2010

(51) Int. Cl.
*G06Q 10/06* (2012.01)
*H04M 3/51* (2006.01)
*H04L 29/08* (2006.01)

(52) U.S. Cl.
CPC ......... *H04M 3/5191* (2013.01); *G06Q 10/06* (2013.01); *H04L 67/02* (2013.01)

(58) Field of Classification Search
CPC ......... H04L 67/02; H04L 67/42; H04L 29/06; G06K 2009/00738; H04N 21/42207; H04M 2203/404; H04M 3/00; H04M 3/5183; H04M 3/5191; H04W 4/16; G06Q 10/06
USPC ........................................................ 709/227
See application file for complete search history.

(56) References Cited

U.S. PATENT DOCUMENTS 5,844,896 A * 12/1998 Marks ................... H04M 3/523
                                                      370/385
5,887,139 A *  3/1999 Madison et al. ............. 709/223
5,903,641 A *  5/1999 Tonisson ............. H04M 3/5233
                                                      379/265.12
6,005,931 A * 12/1999 Neyman et al. ......... 379/220.01
6,154,465 A * 11/2000 Pickett .......................... 370/466
6,201,863 B1 *  3/2001 Miloslavsky ................ 379/242
6,278,777 B1    8/2001 Morley et al.
6,335,971 B1 *  1/2002 Springer ............... H04M 15/47
                                                      379/144.01
6,345,093 B1 *  2/2002 Lee ..................... H04M 3/5237
                                                      379/211.02

(Continued)

FOREIGN PATENT DOCUMENTS

WO  WO-2010025110 A1  3/2010
WO  WO-2010025112 A1  3/2010
WO  WO-2010025113 A1  3/2010

OTHER PUBLICATIONS

Brown, Donald E, "The Interaction Center Platform", *Interactive Intelligence, Inc.*, (2005), 35 pgs.

(Continued)

*Primary Examiner* — Larry Donaghue

(74) *Attorney, Agent, or Firm* — Crawford Maunu PLLC

(57) ABSTRACT

Embodiments of computer-implemented methods and systems for information streaming to a user interface include receiving, at a networked contact center, a Hypertext Transfer Protocol (HTTP) request to stream information to a user interface, establishing a persistent HTTP connection to the user interface, receiving the information, the information including one or more events associated with the networked contact center, and sending the one or more events via the persistent HTTP connection, the one or more events resulting in a change in the user interface without further HTTP requests from the user interface.

19 Claims, 9 Drawing Sheets

(56) References Cited

U.S. PATENT DOCUMENTS

| | | | |
|---|---|---|---|
| 6,393,467 B1* | 5/2002 | Potvin | 709/217 |
| 6,553,115 B1 | 4/2003 | Mashinsky | |
| 6,687,241 B1 | 2/2004 | Goss | |
| 6,741,698 B1 | 5/2004 | Jensen et al. | |
| 6,748,420 B1* | 6/2004 | Quatrano | G06F 17/30873 707/E17.111 |
| 6,760,429 B1* | 7/2004 | Hung et al. | 379/265.09 |
| 6,804,345 B1 | 10/2004 | Bala et al. | |
| 7,023,979 B1* | 4/2006 | Wu | H04M 3/5233 379/265.11 |
| 7,028,091 B1* | 4/2006 | Tripathi et al. | 709/230 |
| 7,028,331 B2* | 4/2006 | Schwalb | 725/140 |
| 7,124,171 B1 | 10/2006 | McCann | |
| 7,145,905 B2* | 12/2006 | Verbil | H04M 3/523 370/385 |
| 7,224,783 B2 | 5/2007 | Creamer et al. | |
| 7,328,001 B2* | 2/2008 | Dawson et al. | 455/406 |
| 7,403,995 B2* | 7/2008 | Mace et al. | 709/227 |
| 7,415,100 B2* | 8/2008 | Cooper | H04M 3/527 379/88.01 |
| 7,480,719 B2* | 1/2009 | Inoue | 709/226 |
| 7,610,388 B2* | 10/2009 | Yamamoto | 709/227 |
| 7,627,658 B2* | 12/2009 | Levett et al. | 709/223 |
| 7,644,172 B2* | 1/2010 | Stewart et al. | 709/231 |
| 7,730,204 B2* | 6/2010 | Pak | 709/238 |
| 7,933,391 B1* | 4/2011 | Gentle | G08B 27/006 379/142.08 |
| 7,958,453 B1* | 6/2011 | Taing | H04L 12/1827 709/204 |
| 8,379,832 B1* | 2/2013 | Lyman | H04M 3/5141 379/265.04 |
| 2002/0198943 A1* | 12/2002 | Zhuang et al. | 709/206 |
| 2003/0093533 A1* | 5/2003 | Ezerzer | H04L 41/0893 709/227 |
| 2003/0097448 A1* | 5/2003 | Menezes | H04L 29/06 709/227 |
| 2003/0123640 A1 | 7/2003 | Roelle et al. | |
| 2003/0172131 A1* | 9/2003 | Ao | 709/219 |
| 2003/0195934 A1* | 10/2003 | Peterson et al. | 709/206 |
| 2003/0208754 A1* | 11/2003 | Sridhar et al. | 725/34 |
| 2003/0217136 A1* | 11/2003 | Cho | H04L 12/2818 709/223 |
| 2003/0236907 A1* | 12/2003 | Stewart et al. | 709/231 |
| 2004/0034591 A1* | 2/2004 | Waelbroeck | G06Q 30/0251 705/37 |
| 2004/0083292 A1* | 4/2004 | Lueckhoff | H04L 69/329 709/227 |
| 2004/0088300 A1* | 5/2004 | Avery et al. | 707/100 |
| 2004/0196968 A1* | 10/2004 | Yue | H04L 29/06 379/210.02 |
| 2005/0041647 A1 | 2/2005 | Stinnie | |
| 2005/0047579 A1 | 3/2005 | Mansour | |
| 2005/0135600 A1 | 6/2005 | Whitman, Jr. | |
| 2005/0256883 A1* | 11/2005 | Greaves | H04L 12/2602 |
| 2006/0026304 A1* | 2/2006 | Price | 710/8 |
| 2006/0168619 A1* | 7/2006 | Reams | 725/38 |
| 2006/0221941 A1* | 10/2006 | Kishinsky | H04M 3/523 370/352 |
| 2006/0239440 A1 | 10/2006 | Shaffer et al. | |
| 2007/0073730 A1* | 3/2007 | Jun | 707/10 |
| 2007/0127665 A1* | 6/2007 | Brandt et al. | 379/201.01 |
| 2007/0162908 A1 | 7/2007 | Erickson et al. | |
| 2007/0192415 A1* | 8/2007 | Pak | 709/206 |
| 2008/0037760 A1* | 2/2008 | Boughton | H04M 3/5175 379/265.02 |
| 2008/0072264 A1* | 3/2008 | Crayford | 725/86 |
| 2008/0177994 A1* | 7/2008 | Mayer | 713/2 |
| 2008/0178278 A1* | 7/2008 | Grinstein et al. | 726/12 |
| 2009/0055195 A1* | 2/2009 | Karlsgodt | 704/500 |
| 2009/0061850 A1* | 3/2009 | Li et al. | 455/426.1 |
| 2009/0064148 A1* | 3/2009 | Jaeck et al. | 718/101 |
| 2009/0066788 A1* | 3/2009 | Baum et al. | 348/143 |
| 2009/0133031 A1* | 5/2009 | Inoue | 718/105 |
| 2009/0190728 A1* | 7/2009 | Bushnell et al. | 379/88.17 |
| 2009/0216683 A1* | 8/2009 | Gutierrez | 705/80 |
| 2009/0316687 A1* | 12/2009 | Kruppa | H04M 3/51 370/352 |
| 2010/0017384 A1* | 1/2010 | Marinescu | G06Q 10/06 707/E17.01 |
| 2010/0054439 A1 | 3/2010 | Salame et al. | |
| 2010/0054448 A1 | 3/2010 | Townsend et al. | |
| 2010/0054450 A1 | 3/2010 | Southwick et al. | |
| 2010/0054451 A1 | 3/2010 | Townsend | |
| 2010/0058234 A1 | 3/2010 | Mansour et al. | |
| 2010/0232583 A1* | 9/2010 | Bettis et al. | 379/88.17 |

OTHER PUBLICATIONS

"U.S. Appl. No. 12/201,671 Non-Final Office Action dated Jun. 28, 2010", 21 pgs.

"International Application Serial No. PCT/US2009/054780, Search Report dated Oct. 8, 2009", 4 pgs.

"International Application Serial No. PCT/US2009/054780, Written Opinion dated Oct. 8, 2009", 5 pgs.

"International Application Serial No. PCT/US2009/054787, Search Report dated Oct. 13, 2009", 4 pgs.

"International Application Serial No. PCT/US2009/054787, Written Opinion dated Oct. 13, 2009", 6 pgs.

"International Application Serial No. PCT/US2009/054788, Search Report dated Oct. 13, 2009", 4 pgs.

"International Application Serial No. PCT/US2009/054788, Written Opinion dated Oct. 13, 2009", 5 pgs.

"U.S. Appl. No. 12/201,671, Final Office Action dated Dec. 14, 2010", 24 pgs.

"U.S. Appl. No. 12/201,671, Response filed Sep. 28, 2010 to Non Final Office Action dated Jun. 28, 2010", 11 pgs.

Fielding, et al., "HTTP/1.1: Connections, 8 Connections", Part of Hypertext Transfer Protocol—HTTP/1.1, RFC 2616, [Online]. Retrieved from the Internet Jan. 12, 2011: <URL:http://www.w3.org/Protocols/rfc2616/rfc2616-sec8.html>, 6 pgs.

Infrequently Noted, "Comet: Low Latency Data for the Browser", [Online]. Retrieved from the Internet: <URL:http://infrequently.org/2006/03/comet-low-latency-data-for-the-browser>, (Mar. 3, 2006), 5 pgs.

McCarthy, Philip, "Ajax for Java developers: Write scalable Comet applications with Jetty and Direct Web Remoting", [Online]. Retrieved from the Internet: <URL: http://www.ibm.com/developerworks/java/library/j-jettydwr/index.html>, (Jul. 17, 2007), 16 pgs.

"U.S. Appl. No. 12/201,599, Preliminary Amendment dated Dec. 8, 2009", 10 pgs.

"U.S. Appl. No. 12/201,639, Preliminary Amendment dated Jul. 1, 2010", 11 pgs.

"U.S. Appl. No. 12/201,671, Response filed Jun. 14, 2011 to Final Office Action Received Dec. 14, 2010", 14 pgs.

Fielding, R., et al., "Hypertext Transfer Protocol—HTTP/1.1, Chapters 1-9.1.2", (Jun. 1999), 22 pgs.

* cited by examiner

FIG. 6

METHODS AND SYSTEMS FOR INFORMATION STREAMING TO USER INTERFACE

TECHNICAL FIELD

This application relates generally to methods and systems for managing networked contact centers, and more specifically, to information streaming to a user interface.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, CONTACTUAL, INC., All Rights Reserved.

BACKGROUND

Traditionally, contact centers are referred to as call centers and are designed to enable a company to handle calls from its clients. The calls received from clients may be distributed to multiple call agents according to certain call distribution and handling methodologies. Ideally, a call center is designed to handle calls with minimal client waiting time, minimal dropped calls, even call distribution to agents, and minimal downtime. Any drastic fluctuations in one or more of these criteria may result in loss of business and/or customer dissatisfaction.

Traditional call centers are normally built to be operated on-premise using proprietary systems with propriety hardware and software. These on-premise call center systems are generally very costly to maintain. The proprietary systems typically require support staff. Furthermore, the systems may be inflexible in the type of applications and hardware that can be supported, limiting the company's ability to upgrade and grow along with any potential increase in demand. Even when upgrade options are available, they tend to be very costly and may require replacing a current system with another more advanced system, causing further stress to the supporting staff, the agents and the clients. The call centers may be implemented using client/server architecture. Typically, in client/server HTTP communications, a request to the server results in a single response in a one-to-one protocol. When nearly instantaneous status update is desired, the approach may be impractical.

BRIEF DESCRIPTION OF DRAWINGS

Some embodiments are illustrated by way of example and not limitation in the figures of the accompanying drawings in which:

FIG. 6 is a diagram illustrating a user interface, in accordance with an example embodiment.

DETAILED DESCRIPTION

Figure 1:
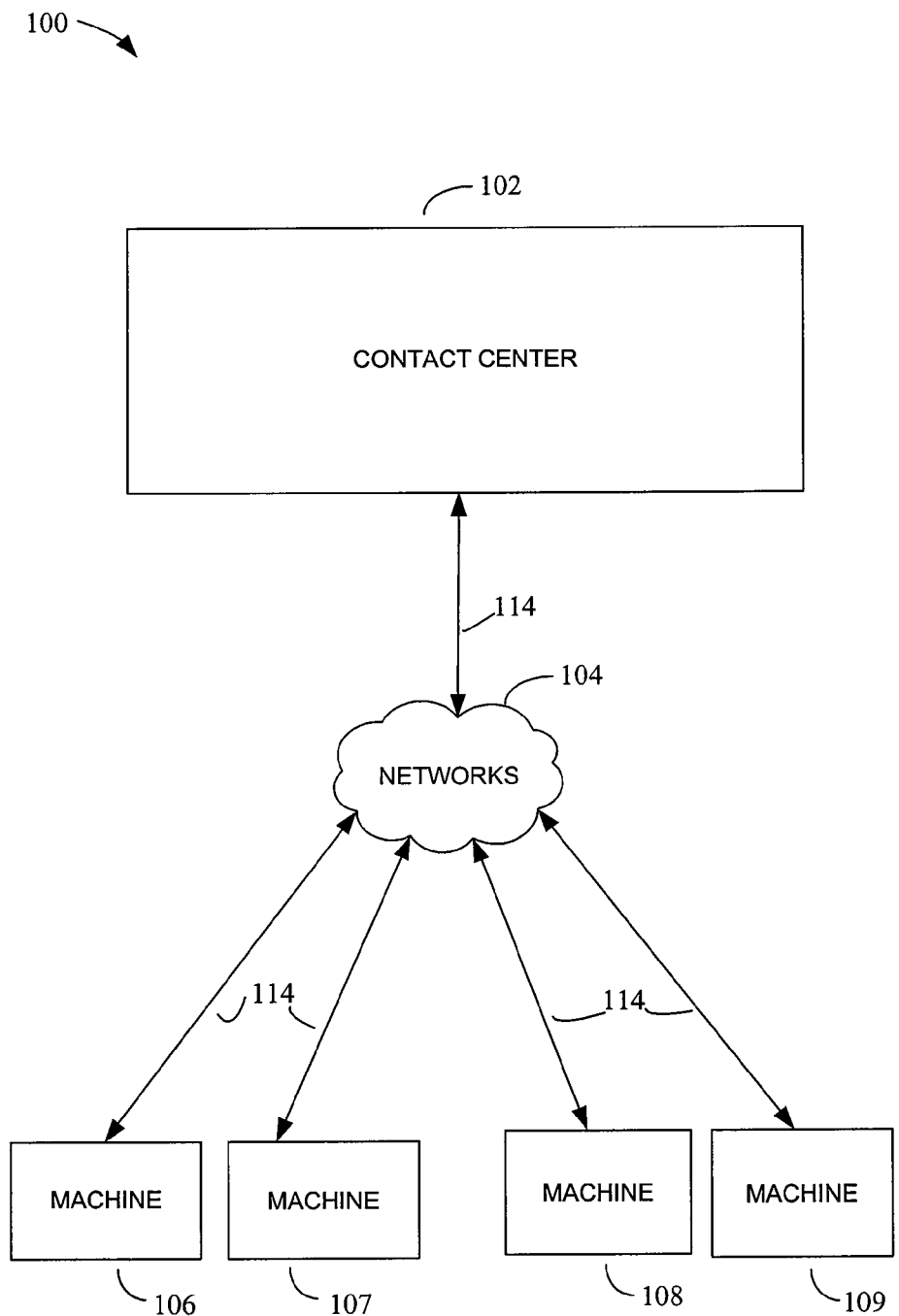
FIG. 1 is a high-level diagrammatic representation of an on-demand contact center, according to an example embodiment.

For some example embodiments, methods and systems for information streaming to a user interface are described. An example method may comprise receiving, at a networked contact center, a Hypertext Transfer Protocol (HTTP) request to stream information to a user interface associated with a networked contact center. Responsive to receiving the request, a persistent HTTP connection may be established.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Introduction

Methods and systems for information streaming to a user interface, in some example embodiments may permit a user interface (e.g., a web browser) to receive events initiated on a server and pushed to the user interface. Typically, in the Hypertext Transfer Protocol (HTTP), a request/response communications model is utilized to transfer information between a client and a server. The HTTP client may comprise a web browser manipulated by an end-user. The HTTP client may send a request to the server and receive a single response. However, this approach may be impractical in situations where a nearly instantaneous status update is desirable.

For example, in a typical HTTP environment, a web browser may send a request for information related to an agent periodically (e.g., every 10 seconds) and get a response when, for example, the agent becomes available. Such approach may be impractical, however, because sending repetitious requests to the server consumes considerable bandwidth of the connection between the client and the server. Thus, if there are 1000 agents and each client application associated with those agents sends a request to the server every 10 seconds, there will be 10,000 requests sent every 10 seconds. Additionally, if a request is sent every 10 seconds, there is a possibility of a telephone call arriving from a customer 1 second into the 10-second interval. Even though an agent is available to answer the telephone call, the agent would not be aware of the telephone call, because the status will not update until 9 seconds later.

Methods and systems for information streaming to a user interface may utilize an HTTP persistent connection, which permits sending and receiving multiple HTTP requests/responses via the same connection, as opposed to opening a new connection for every single request/response pair. Advantages of such persistent connection may include less CPU and memory usage as well as reduction in network congestions and latency of subsequent requests. HTTP communicating may include a technique in which multiple HTTP requests are written to a single socket without waiting for the corresponding responses. The communicating of HTTP requests may result in an improvement in page loading times, especially over high latency connections.

For example, the server may stream events to the browser, which may inform the client about an incoming telephone call from a customer. The client logic may act upon the event to make an icon of the user interface representing a telephone flash. The information streamed to the browser may also include a telephone number and the name of the calling person. In another example, an agent may be interested in statuses of other agents associated with the same tenant. When other agents become unavailable or are offline, the server may start streaming event information to the browser of the agent. In another example, a button blinks as a result of an event being pushed. As already mentioned above, an event being pushed to a user interface does make the button blink. In order for the user interface to display a blinking button, the client side logic may receive the event first and then acts on the event.

Methods and systems for information streaming to a user interface, in some example embodiments, may commence by opening an HTTP connection. The connection may be kept open and the server may receive a request to send events to the browser as they appear. If the HTTP connection times out or is broken, it may be reestablished some time later (e.g., 0.5 seconds). In the meantime, the events may be queued. The events being streamed to the browser may include an agent picking up his telephone, an agent changing status, and arrival of a telephone call. When an agent picks up the telephone, the server may send a new event to the browser, changing the status of the agent.

Networked Contact Center

FIG. 1 is a block diagram showing an example networked contact center 100, in accordance with an example embodiment. FIG. 1 is shown to include a networked contact center 102 that is communicatively coupled with networks 104, via transmission media 114. Also communicatively coupled with the networks 104, via the transmission media 114, are machines 106-109. One or more of the machines 106-109 may be used by call agents or call supervisors associated with a company (also referred to as a tenant). One or more of the machines 106-109 may be used by customers or potential customers of the company.

The networks 104 may be used to communicatively couple the networked contact center 102 with the machines 106-109. In an example embodiment, networks 104 include the Internet and a public switched telephone network (PSTN). Other types of networks may be included within the networks 104 without departing from the claimed subject matter. The transmission media 114 may include any transmission media appropriate for supporting the networks 104. In an example embodiment, the transmission media 114 may include one or more of optical fiber, twisted pairs and wireless media. Other transmission media not described may also be used.

Contact made between the networked contact center 102 and the various machines 106-109 may include various modes of communications (e.g., electronic communications) that may be digitally encoded, composed of analog signals and/or include a combination of digital and analog communication. Some example types of contact may include communications made via Voice Over Internet Protocol (VOIP), analog telephone, online chat, text messaging, electronic mail (email), video conferencing, screen sharing, web conferencing and file sharing, radio broadcast, etc. It is to be appreciated that example forms of communication are provided herein to illustrate types of contact and not to limit the meaning of contact to certain forms of communication.

The networked contact center 102 may perform various contact related tasks (described in more detail below), on behalf of one or more tenants. The networked contact center 102 may be implemented in software, hardware or a combination of both software and hardware. The networked contact center 102 may comprise contact center machines (not shown) that execute instructions to perform the various contact related tasks (e.g., call distribution, call routing, call prioritizing, call transferring, etc.). One or more of the contact center machines may include interface hardware to communicate with the machines 106-109 via the transmission media 114 and the networks 104. It may be noted that the number of customers, agents or supervisors (and e.g., machines used by the customers, agent and supervisors) that communicate with the networked contact center 102 may be significantly increased when the number of tenants supported by the networked contact center 102 also increases. One or more of the contact center machines may be responsible for storing data associated with the one or more tenants. The data may include, for example, tenant-specific call configuration, agents' identification, supervisors' identification, call recordings, call statistics, etc. For some example embodiments, there may be multiple instances of the same data that may be used as backup and for recovery purposes.

Tenant

A tenant is an entity (e.g., a company, an employer, etc.) that seeks to address contact made by other entities (e.g., customers, employees, associates, etc.) with which the tenant has a relationship. To help respond to such contact, an example tenant may use the networked contact center 102 to receive the contact, organize the contact, allocate the contact, transmit the contact, and to perform other contact center related services for the benefit of the tenant. In addition to using the networked contact center 102, a tenant may look to yet further entities (e.g., agents, consultants, business partners, etc.) to help address the various contacts referred to above (e.g., contact from the customers, associates, etc.).

Entities such as, for example, agents and customers may transmit and/or receive communications using the machines 106-109. The machines 106-109 may include interface hardware (not shown) and software to transmit and/or receive communications via the transmission media 114 to and/or from the networks 104 and the networked contact center 102. It is to be noted that the machines 106-109 may represent different types of machines (e.g., personal computers (PCs), mobile devices, telephones or any other network device). In an example embodiment, an entity associated with the machine 106 is a tenant's agent and a different entity associated with the machine 108 is the tenant's customer. In various example embodiments, on behalf of the tenant, the agent using the machine 106 may communicate via the networks 104 and the networked contact center 102 with the customer that is using the machine 108.

Contact Center Functional Modules

Figure 2:
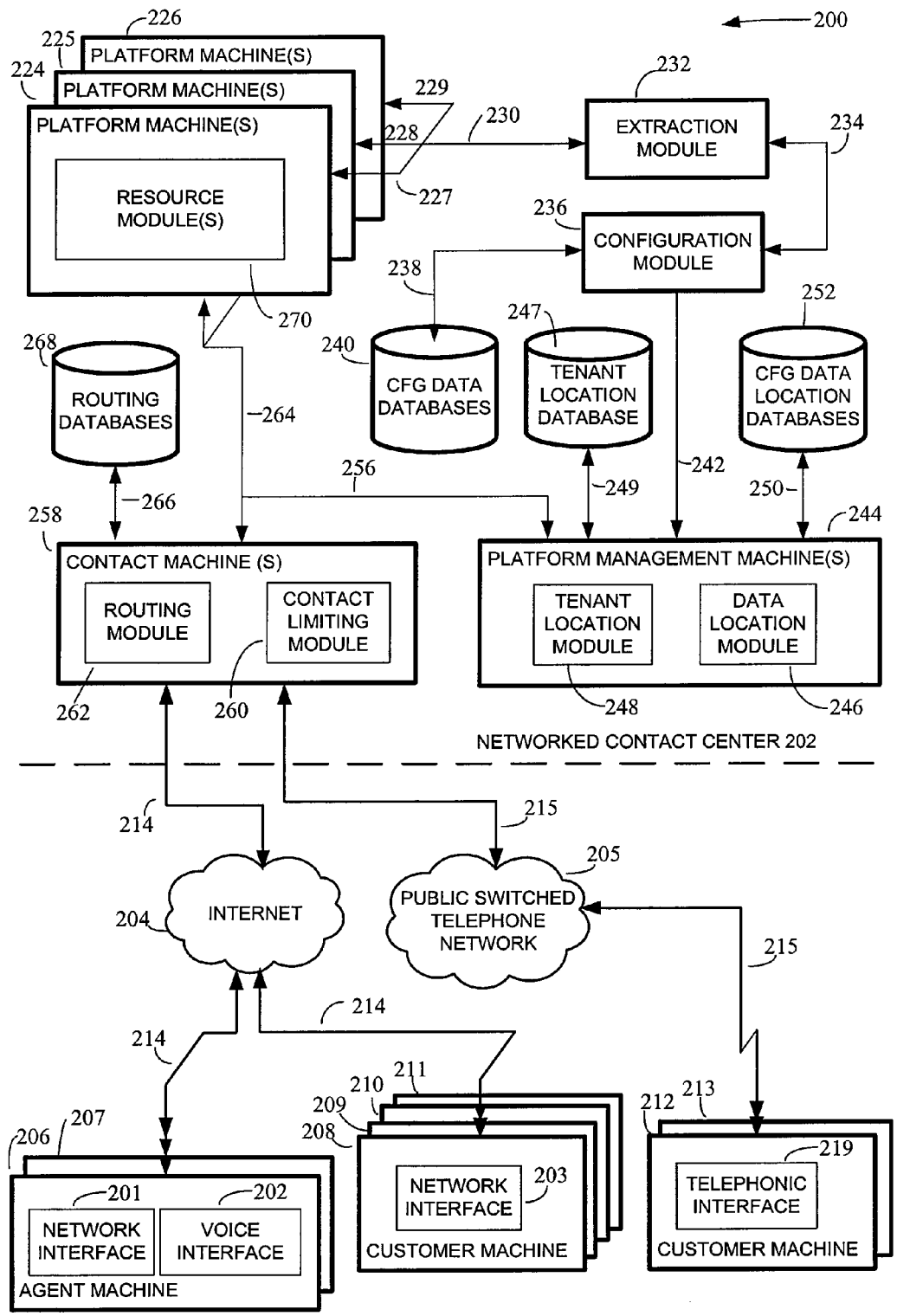
FIG. 2 is a further diagrammatic representation of an on-demand contact center, according to an example embodiment.

FIG. 2 is a block diagram illustrating a network 200, in accordance with an example embodiment. The network 200 is shown to include an example networked contact center 202 communicatively coupled with agent machines 206, 207 and customer machines 208-211 via the transmission media 214 of the Internet 204. The example networked contact center 202 is further communicatively coupled with customer machines 212 and 213 via the transmission media 215 of the PSTN 205.

Although the current example may illustrate customers and agents associated with one tenant, it is to be understood that the networked contact center 202 may be configured to support or host multiple tenants (and therefore may also be referred to as a hosted networked contact center or just a hosted contact center). For some example embodiments, the tenants may not need to install any call-distribution system on-premise. To host these multiple tenants, the networked contact center 202 may include multiple platforms and databases to store configurations specific to each tenant. The networked contact center 202 may also implement backup and recovery schemes to reduce system down time.

Figure 3:
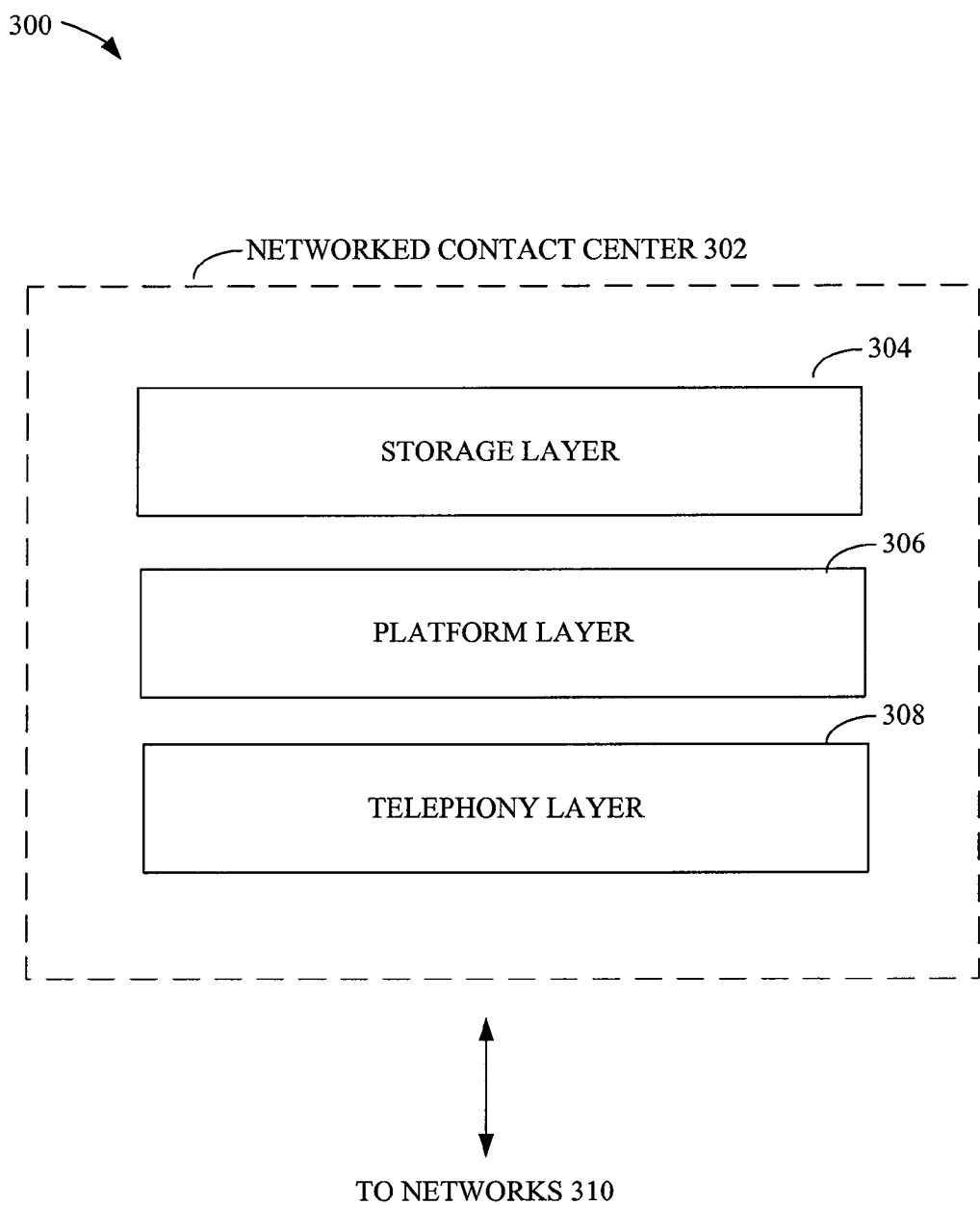
FIG. 3 is a block diagram illustrating a network including a networked contact center organized into layers, in accordance with an example embodiment.

FIG. 3 is a block diagram illustrating a further network 300 including networked contact center 302 organized into layers, in accordance with an example embodiment. The networked contact center 302 may be substantially similar to the networked contact center 202 of FIG. 2. The networked contact centers 202, 302 may be organized into multiple logical groups or layers. There may be a storage layer 304, a platform layer 306 and a telephony layer 308. For some example embodiments, the telephony layer 308 may be responsible for receiving calls that come into the networked contact centers 202, 302. Depending on the dialed number associated with the call, the telephony layer 308 distributes the call to an appropriate platform in the platform layer 306. For some example embodiments, each platform in the platform layer 306 may be associated with one or more machines (also referred to as platform machines). Each platform server may support one or more tenants. For some example embodiments, each tenant may be associated with two or more platforms. A first platform may be used as a primary platform, and a second platform may be used as a backup platform. Incoming calls distributed to a tenant may always be directed to the primary platform unless the tenant is reconfigured to direct the incoming calls to the backup platform. For some example embodiments, the backup platform is operational while the primary platform is operational even when all calls are being processed by the primary platform. This may be valuable when there are problems with the primary platform, since switching the operations to the backup platform may not cause too much delay in the call handlings associated with the tenant.

For some example embodiments, the multiple platforms in the platform layer 306 may share the same data in the storage layer 304. The storage layer 304 may be associated with databases and associated database machines. The storage layer 304 may itself be partitioned into multiple images for backup and recovery and for efficient access. For some example embodiments, mapping may be used to relate a tenant on a particular platform to the tenant's data in the storage layer 304.

Thus, the networked contact center 302 may include logic to receive calls, to determine to which of the multiple supported tenants the calls belong, to distribute the calls to the right platform, and to determine where the data associated with the tenant may be found.

Using the organization described above, the networked contact center 102 may be easily upgraded and maintained with little or minimal impact to the tenant. For example, a tenant may be operating with a backup platform while the primary platform is upgraded from one software level to another software level. Once the upgrade is completed, operations may be switched back to the primary platform. Similarly, because both the primary platform and the backup platform share the same data in the storage layer 304, switching from the backup platform to the primary platform can be accomplished with minimal impact to the tenant and system availability. It may be noted that some calls may be affected during the switch; however, as is typical with telephone calls, the customers may re-dial or call the tenant again. It may be likely that the re-dialed calls may be received by the networked contact center 102 after the switch is complete.

Referring again to FIG. 2, platform machines 224-226 may be communicatively coupled with an extraction module 232 via communication channels 227-229, respectively, and communication channel 230. Platform machines 224-226 are further communicatively coupled to contact machine(s) 258 via communication channel 264. The contact machine(s) 258 are communicatively coupled with the routing databases 268 via the communication channel 266.

Platform management machine(s) 244 are shown to be communicatively coupled with configuration data location databases 252 via communication channel 250, with tenant location database 247 via communication channel 249, and with contact and platform machine(s) 258 and 224-226, respectively, via the communication channels 256 and 264. The platform management machine(s) 244 are further shown to be communicatively coupled with the configuration module 236 via communication channel 242, while the configuration module 236 is communicatively coupled with the extraction module 232 and the configuration data databases 240 via communication channels 234 and 238, respectively. The machines and modules of FIG. 2 are to be described in further detail with respect to FIG. 4, which follows.

Flow Diagram

Figure 4:
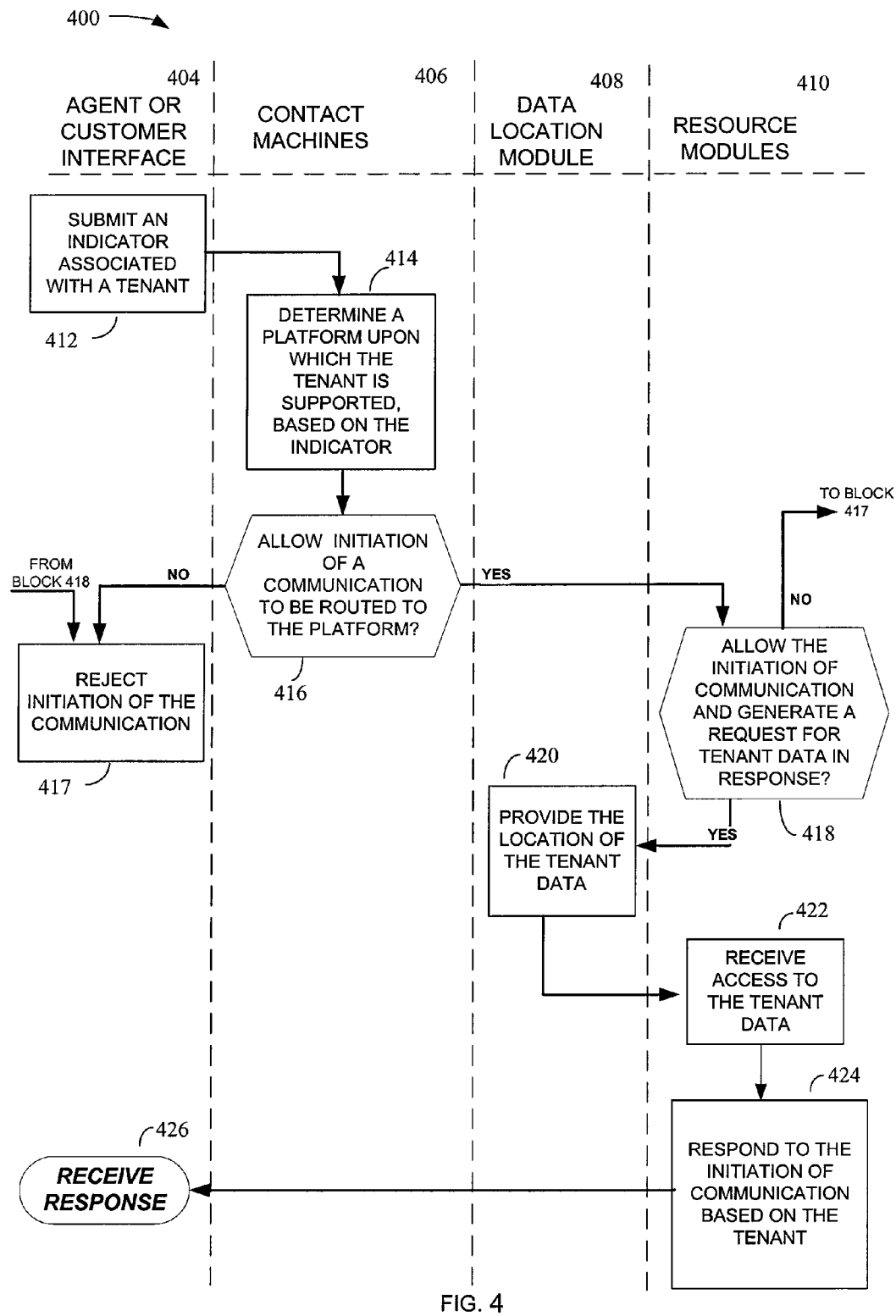
FIG. 4 is a flow diagram illustrating example actions performed by various on-demand contact center components in response to agent or customer contact, according to an example embodiment.

FIG. 4 is a flow diagram 400 showing example actions performed by various components of a networked contact center for responding to agent or customer contact, in accordance with an example embodiment. In FIG. 4, each column represents a lane in which action(s) are carried out. Actions in lanes 404, 406, 408 and 410 may be performed by certain machines and/or modules shown in FIG. 2. It may be noted that a module may represent software, hardware and/or a combination of software and hardware used to implement logical constructions and/or to process instructions. Although shown in separate lanes, one module may be included in, or composed of, one or more of the other modules.

The flow diagram 400 may begin at block 412 with an agent or customer submitting an indicator associated with a tenant along with an initiation of communication. In FIG. 2, the customer machine 212 is shown to include a telephonic interface 219 (e.g., a telephone with a handset). In an example embodiment, a customer seeking customer support from a tenant dials a tenant's phone number on a telephone to place a call (e.g., initiation of communication) to the networked contact center over the PSTN. In an example embodiment, the telephone number itself serves as an indicator of the tenant whose attention is sought by the customer.

The customer machine 208 is shown to include a network interface 203 (e.g., a web browser) with which a customer may, for example, submit a chat request to the networked contact center 202 over the Internet to receive, for example, technical support from a tenant. An agent of the tenant or a contact supervisor may also contact the tenant. In an example embodiment, an agent using the agent machine 206 uses the network interface 201 to log on to an agent network server hosted by the networked contact center 202 to notify the networked contact center 202 that the agent is available to be contacted by customers. In some example embodiments, the agent may use the voice interface 217 to speak with a customer or another agent.

In various example embodiments, the indicator submitted at block 412 is received by the contact machines(s) 258. In FIG. 2, the contact machine(s) 258 are shown to include a routing module 262 and a contact limiting module 260. The routing module 262 may route contacts to a certain platform depending on the tenant indicated by the indicator (e.g., a phone number, username/password or any other indicator designating a tenant). The example contact limiting module 260 may regulate incoming contact with the networked contact center 202.

At block 414, the routing module 262 within the contact machines 258 of FIG. 2 may determine a platform upon which the tenant is supported based on the indicator received from the agent or customer at block 412. In an example embodiment, in FIG. 2, the routing module 262 accesses the routing databases 268 via communication channel 266 to associate an indicator with a tenant and a platform. In some example embodiments, the contact machine(s) 258 submit a request, via the communication channel 256 to the platform management machine(s) 244 to determine a platform associated with the indicator (e.g., and a tenant corresponding to the indicator).

At decision block 416, the example flow diagram 400 includes the example contact limiting module 260 within the contact machines 258 of FIG. 2 determining whether to allow the initiation of communication (e.g., a telephone call from a customer) to be routed to a platform (e.g., the platform machine(s) 224).

The contact limiting module's 260 determination of whether to allow the initiation of communication may include referencing a current allowance of contact or communication (e.g., a bucket value, described in more detail below) to be received by a particular communication layer or platform (e.g., within the platform machines 224) in a fixed period of time. In some example embodiments, each platform may vary a maximum allowance of contact for a period of time or vary the period of time based on an availability of platform resources. In some example embodiments, when contact directed to a platform is received by the contact machines 258 and the current allowance is less than or equal to zero, the contact limiting module 260 may reject initiation of the communication as shown in block 417 of FIG. 4. When the contact directed to the platform is received by the contact machines 258 and the current allowance is greater than or equal to one, the contact limiting module 260 may allow the initiation of communication to be routed to the platform as shown between blocks 416 and 418 of FIG. 4.

Alternatively or additionally, determination of whether to allow the initiation of communication may be made by a platform at block 418 after the contact limiting module has allowed the initiation of communication to be routed to the platform at block 416. In various example embodiments, a platform may reject the initiation of communication based on availability of platform resources or other conditions warranting a rejection. Such a rejection is represented by block 417.

In an example embodiment, in FIG. 2, a platform may allow the initiation of communication from the contact machines(s) 258. Example resource module(s) 270 located on the platform machine 224 and located on the other platform machines 225-226, may include various modules that provide services for multiple tenants. Example resource module(s) 270 may include interaction routers, interactive voice recordings, scripting, agent network server, media control and other contact center related services, etc.

In an example embodiment, the initiation of communication is a voice call from a customer seeking help with installing a water heater; the tenant is in the business of providing technical support for refrigerator installations and water heater installations. The tenant employs some agents who address questions about refrigerator installations while the tenant's other agents address questions about water heater installations.

At block 418, the flow diagram 400 includes the resource module(s) 270 of FIG. 2 allowing the initiation of communication and generating a request for data associated with a tenant, based on the initiation of communication. In the appliance installation example, the resource module(s) 270 request tenant data to be used to teleprompt the customer, prompting the customer to press 1 on their telephone dial for refrigerator installation support or to press 2 for water heater installation support.

Example platform machine(s) 224, 225 and 226 may initially request the data associated with the tenant from the extraction module 232 and the configuration module 236. In an example embodiment, to locate data for data access, the resource module(s) 270 may use a different addressing system than the configuration module 236 uses to locate and access the same data. In some example embodiments, the extraction module 232 translates requests from the platform machine(s) 224, 225, 226 to allow the configuration module 236 to understand the request. The configuration module 236 may access the requested data in the configuration data databases 240 and relay the requested data to the resource module(s) 270 on a set of platform machine(s) (e.g., platform machine(s) 224) via the extraction module 232.

The configuration module 236 may not initially locate the requested data in the configuration data databases 240. In some example embodiments, the configuration module 236 may request the location of the requested data from the data location module 246 that may be located within the platform management machine(s) 244.

At block 420, the flow 400 may include the data location module 246 providing the location of the requested data (e.g., the location within the configuration data databases 240) to the configuration module 236. The configuration module 236 may then access the requested data to provide it to the resource module(s) 270 via the extraction module 232.

At block 422 of the flow 400, the example resource module(s) 270 receive access to the requested data (e.g. tenant data). With access to the particular tenant data, an example resource module 270 may generate a particular response to the initiation of communication received from the agent or customer.

At block 424 of the flow 400, the resource module(s) 270 respond to the initiation of the communication based on the data (e.g., the tenant data). The agent or customer that initiated communication may receive the response where the flow ends at terminal 426. In the appliance installation support example, the response to the initiation at terminal 426 may be the tenant's teleprompter asking the customer to indicate the nature of the call.

Module Diagram

Figure 5:
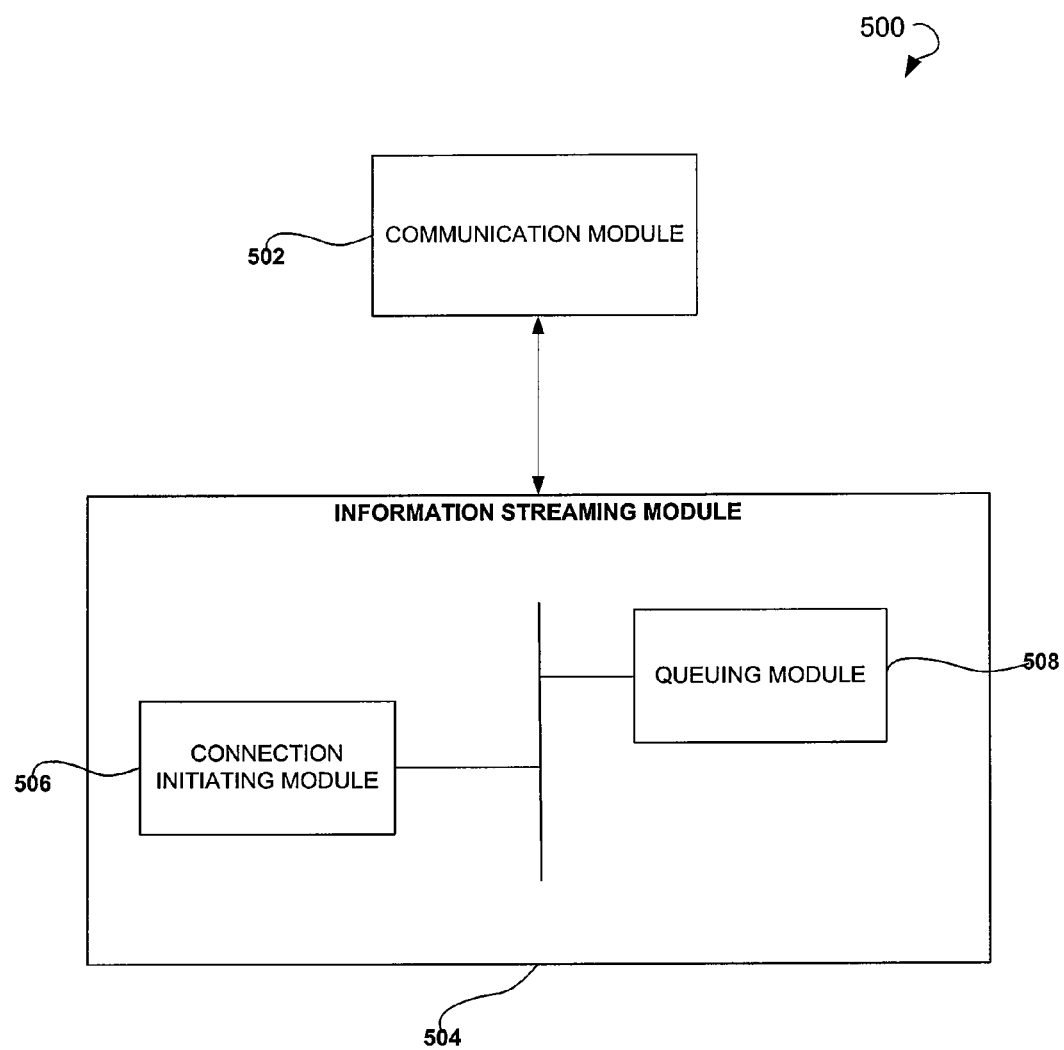
FIG. 5 is a block diagram illustrating an information-streaming engine, in accordance with an example embodiment.

FIG. 5 is a block diagram illustrating a system for information streaming to a user interface 500 in accordance with an example embodiment. The example system for information streaming to a user interface 500 is shown to include example components that may be configured to perform various operations facilitating information streaming to a user interface. In some example embodiments, system for information streaming to a user interface 500 may include a communication module 502 and an information streaming module 504, which in turn includes a connection initiating module 506 and a queuing module 508.

The communication module 502 may be configured to receive a request to stream information to a user interface. The user interface may be associated with a networked contact center. The user interface may include Graphical User Interface (GUI), described in more detail below with reference to FIG. 6. The communication module 502 may receive a request to stream the information to the user interface. For example, the communication module 502 may receive a request to provide a telephone number and a name of a calling person via the persistent connection established between the server and the user interface. The persistent connection may time out after a predetermined period of time, and the communication module 502 may queue events until the persistent connection is reestablished.

The communication module 502 may be configured to receive information related to events associated with the networked contact center. For example, the communication module 502 may receive events indicating that an agent becomes available, a telephone call arrives, a status of an agent changes, or an agent picks up a telephone. The connection-initiating module 506 may be configured to establish a persistent connection to the user interface. The persistent connection to the user interface may be facilitated by Hypertext Transfer Protocol (HTTP). The queuing module 508 may be configured to queue events when the persistent connection times out or otherwise becomes unavailable. Various operations performed by the information-streaming engine 500, according to an example embodiment, are described by a way of example with reference to FIG. 7 and FIG. 8.

Figure 6:
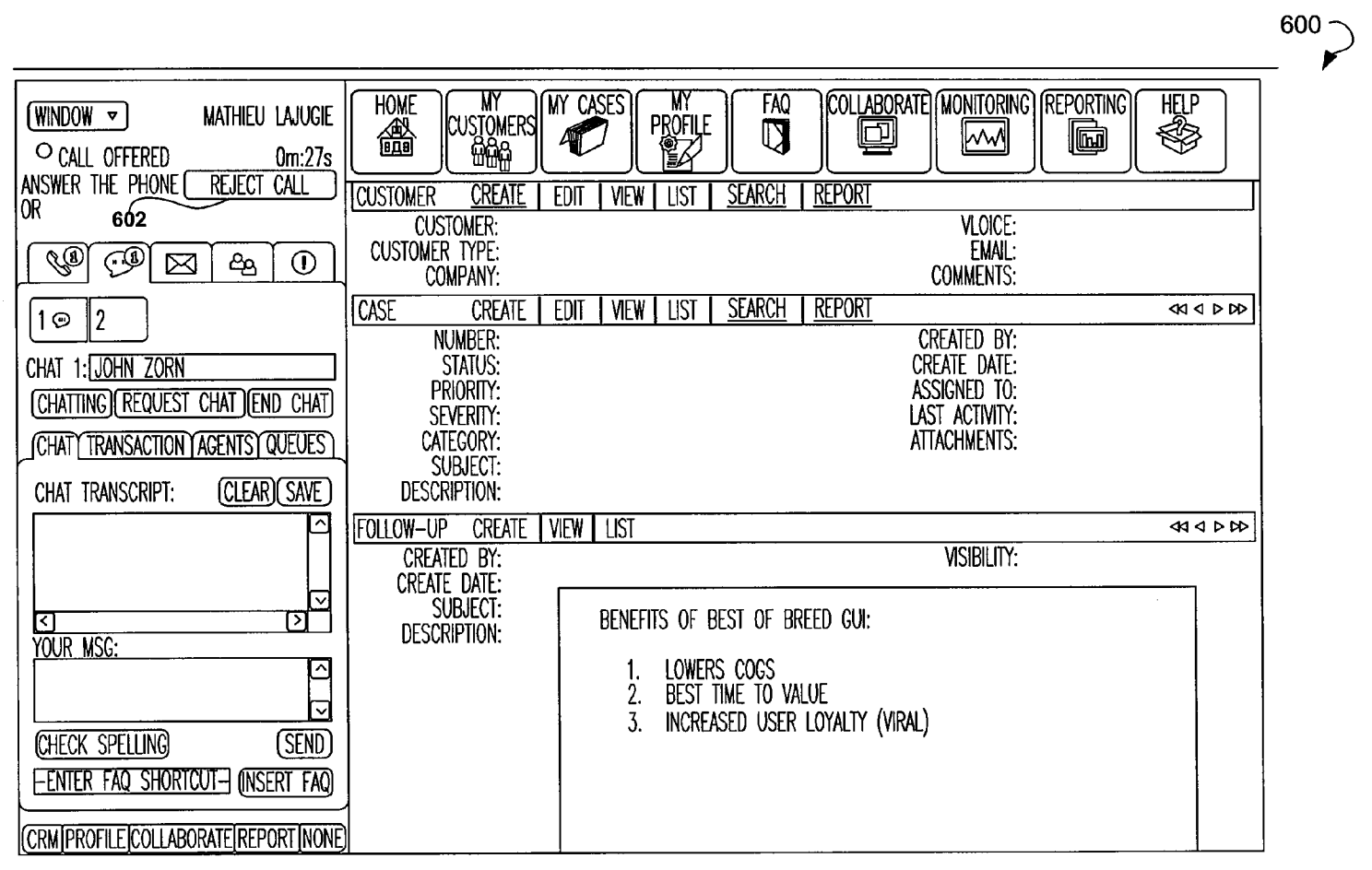

FIG. 6 is a diagram illustrating a user interface 600, in accordance with an example embodiment. A GUI is a type of user interface, which may permit users to interact with electronic devices like computers, hand-held devices (personal digital assistants (PDAs), MP3 players, portable media players, gaming devices, etc.), household appliances and office equipment. As opposed to traditional interfaces, a GUI presents graphical icons, visual indicators or special graphical elements called "widgets". Often the icons are used in conjunction with text, labels or text navigation to fully represent the information and actions available to a user. Instead of offering only text menus, or requiring typed commands, the actions are usually performed through direct manipulation of the graphical elements. In FIG. 6, a button 602, titled "reject call" is shown enabled. When enabled, the button 602 permits an agent to reject an incoming call. The agent may become aware of the incoming call when the button 602 starts blinking. Blinking of the button 602 is an example of an event being pushed from the server to the interface 600. However, an event being pushed to a user interface does make the button blink. In order for the user interface to display a blinking button, a client side logic (not shown) may receive and the event and then act on the event.

Figure 7:
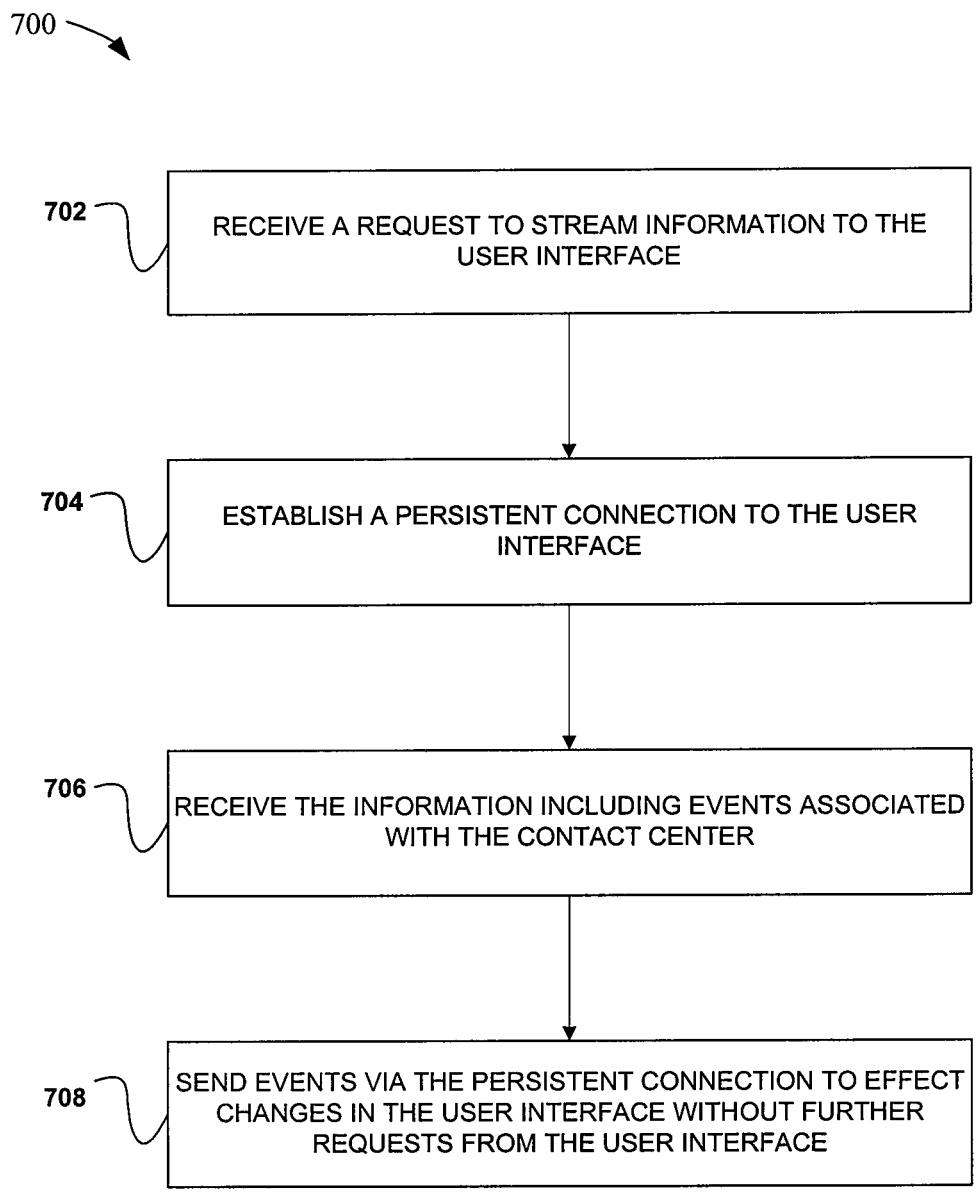
FIG. 7 is a flow diagram illustrating a high-level method of information streaming to a user interface, in accordance with an example embodiment.

FIG. 7 is a flow diagram illustrating a high-level method 700 of information streaming to a user interface, in accordance with an example embodiment. The method 700 may be performed by processing logic (e.g. dedicated logic, programmable logic, microcode, etc.) that may comprise hardware, software (such as that run on a general-purpose computer system or a dedicated machine), or a combination of both. In one example embodiment, the method 700 may be performed by the various modules discussed above with reference to FIG. 5. Each of these modules may comprise processing logic.

As shown in FIG. 7, the method 700 may commence at operation 702 with the communication module 502 receiving a request to stream information to the user interface. The request may specify that the server may push certain types of events (e.g., a new chat) on arrival. At operation 704, the communication module 502 may establish a persistent connection to the user interface. As already mentioned above, HTTP persistent connections may be utilized for this purpose. At operation 706, the communication module 502 may receive information including events associated with the networked contact center. For example, the information may include an event indicating an incoming call from a customer. At operation 708, the communication module 502 may send the events received at operation 706 to the user interface via the persistent connection established at operation 704. No further requests from the user interface are necessary.

Figure 8:
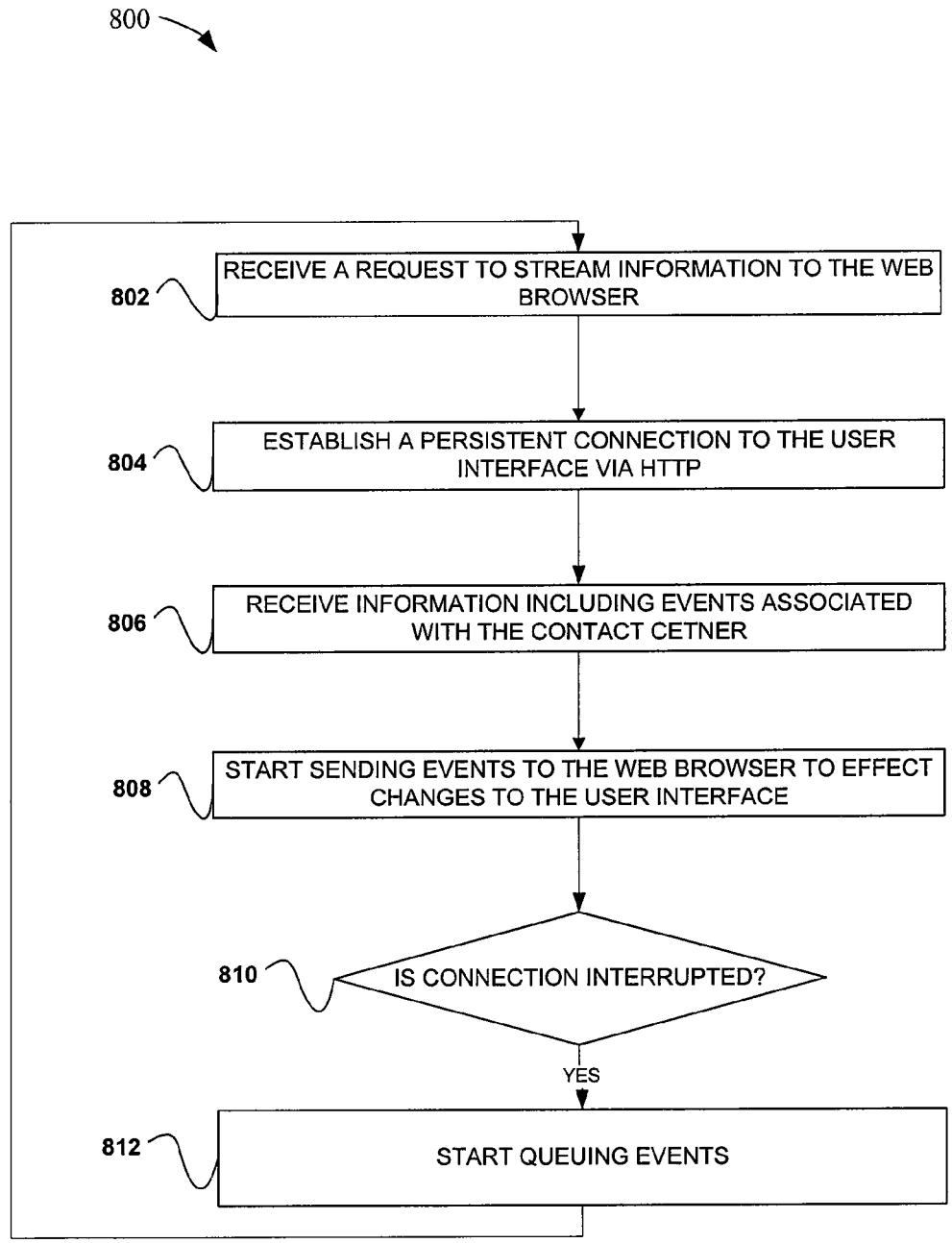
FIG. 8 is a flow diagram illustrating a further, more detailed method of information streaming to a user interface, in accordance with an example embodiment.

FIG. 8 is a flow diagram illustrating a further, more detailed method 800 of information streaming to a user interface, in accordance with an example embodiment. The method 800 may be performed by processing logic (e.g., dedicated logic, programmable logic, microcode, etc.) that may comprise hardware, software (such as that run on a general-purpose computer system or a dedicated machine), or a combination of both. In one example embodiment, the method 800 may be performed by the various modules discussed above with reference to FIG. 5. Each of these modules may comprise processing logic.

As shown in FIG. 8, the method 800 may commence at operation 802 with the communication module 502 receiving a request to stream information to the web browser. The operation is substantially similar to operation 702 described with reference to FIG. 7. At operation 804, the connection-initiating module 506 may establish a persistent connection to the user interface via HTTP. HTTP is a communications protocol for the transfer of information on the World Wide Web. HTTP is a request/response standard between a client and a server. The client may include the user interface 600 described with reference to FIG. 6 above. A user may make an HTTP request using a user interface. The responding server may store or creates resources such as HTML files and images. An HTTP client may initiate a request to an HTTP server. In response, the HTTP server may send a response.

The methods and systems for information streaming to user interface may utilize persistent HTTP connections. Persistent HTTP connections permit reusing the same connection to send and receive multiple HTTP requests/responses, as opposed to opening a new connection for every single request/response pair. This approach permits less CPU and memory usage (because fewer connections are open simultaneously) and enables communicating of HTTP requests and responses. The approach may also result in reduced network congestion (fewer TCP connections), reduced latency in subsequent requests (no handshaking), and errors being reported without the penalty of closing the TCP connection In some example embodiments, communicating of HTTP requests may be utilized to write out multiple HTTP requests to a single socket without waiting for the corresponding responses. Communicating of requests may result in an improvement in page loading times, especially over high latency connections.

At operation 806, the communication module 502 may receive information including events associated with the networked contact center, and at operation 808, the communication module 502 may start communicating events to the web browser to effect changes to the web browser. In a conventional client/server environment, all actions are instigated from the user interface. A user must click on something or do some other action. This results in a message being sent to the server, and may result in a response from the server. The methods and systems for information streaming to a user interface permit the server to stream events to the user interface without any action being taken on the user interface side of the transaction.

For example, a telephone call may arrive and the server would like to send the event to the browser on the agent's machine. The method 800 permits streaming the event to the browser and to cause an icon representing a little telephone to flash, and to show information about the call. The information may include a telephone number and the name of the calling person. In another example, an agent may be looking at the list of all agents who are associated with a certain tenant and are currently available to receive communications. In yet another example, when an agent goes offline, the server may pick up the event and stream it to the user interface of other agents to inform them that the agent is no longer available to answer calls.

Typically, a web browser sends a request for information (e.g., every 10 seconds) and gets a response if the status has changed. Sending repetitive requests to the server may consume a lot of bandwidth. Instead of having one HTTP request and one response, the HTTP connection is kept open. This permits receiving a string of responses as they are generated, instead of just one response per session. The connection may have a timer that may enable closing the connection after a certain predetermined time. The connection is kept open and the server may receive a request to send events to the user interface as they appear. If the connection times out or is somehow broken, it may be reestablished some time later (e.g., 0.5 seconds). In the meantime, events may be queued. The events being sent to the browser may include, among others, an agent picking up the phone, an agent changing status, and arrival of a call. For example, when an agent picks up the phone, the server may send a new event to the browser, changing the status. The connection may time out or otherwise become broken. Once the connection is reestablished, the events that were queued while the connection was broken may be pushed to the user interface. Thus, at decision block 810, the information streaming module 504 may determine whether the connection is interrupted, and at operation 812, the queuing module 508 may start queuing events to the user interface.

System Diagram

Figure 9:
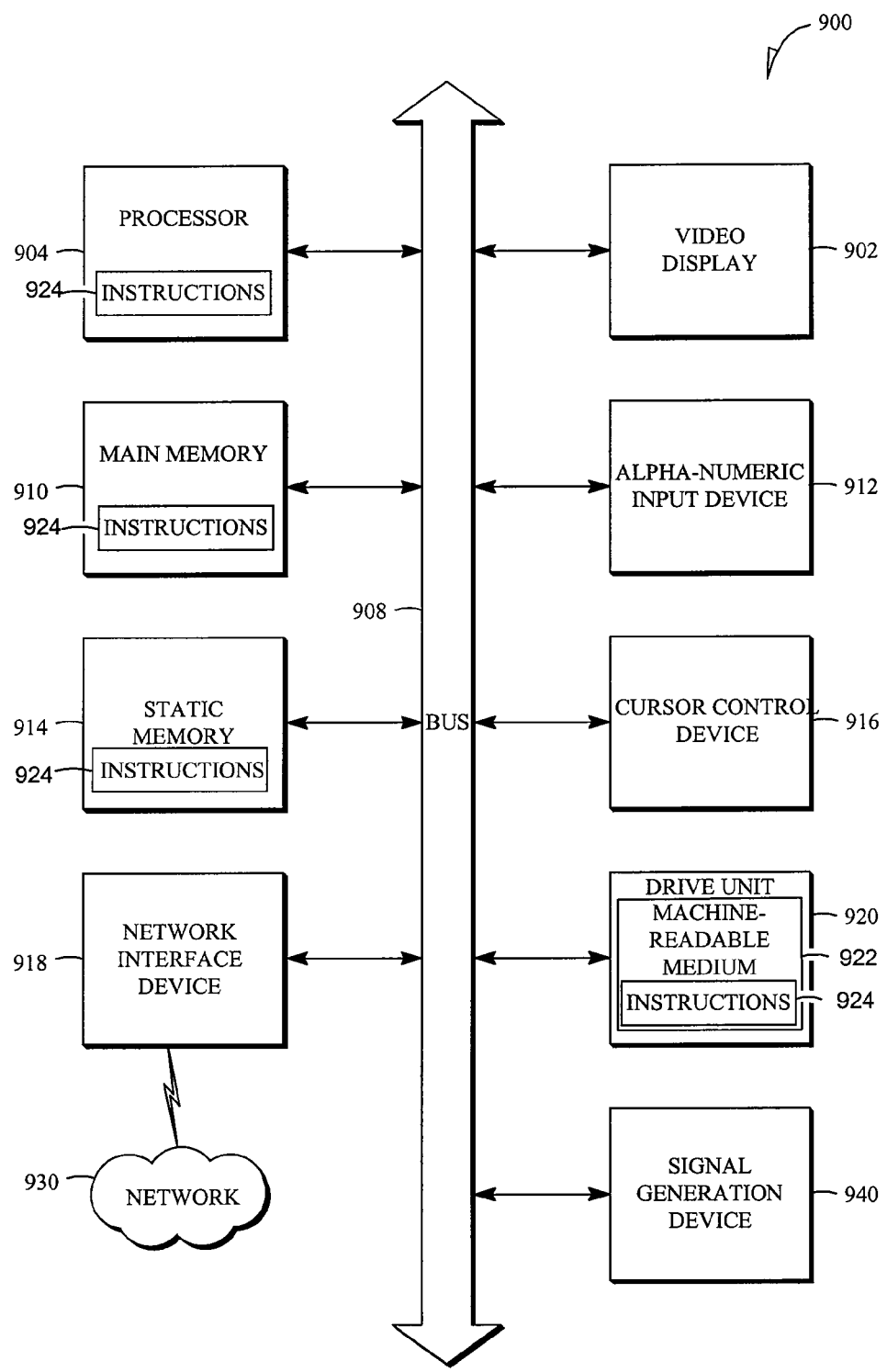
FIG. 9 is a diagrammatic representation of an example machine in the form of a computer system, within which a set of instructions for causing the machine to perform any one or more of the methodologies discussed herein may be executed.

FIG. 9 shows a diagrammatic representation of a machine in the example form of a computer system 900, within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a PC, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 904 (e.g., a central processing unit (CPU), a graphics processing unit (GPU) or both), a main memory 910, and a static memory 914, which communicate with each other via a bus 908. The computer system 900 may further include a video display unit 902 (e.g., liquid crystals display (LCD) or a cathode ray tube (CRT)). The computer system 900 also includes an alpha-numeric input device 912 (e.g., a keyboard), a cursor control device 916 (e.g., a mouse), a disk drive unit 920, a signal generation device 940 (e.g., a speaker), and a network interface device 918

The disk drive unit 920 includes a machine-readable medium 922 on which is stored one or more sets of instructions 924 (e.g., software) embodying any one or more of the methodologies or functions described herein. The instructions 924 may also reside, completely or at least partially, within the main memory 910, within the static memory 914, and/or within the processor 904 during execution thereof by the computer system 900, the main memory 910 and the processor 904 also constituting machine-readable media.

The instructions 924 may further be transmitted or received over a network 930 via the network interface device 918.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present subject matter. The term "machine-readable medium" shall accordingly be taken to include, but not be limited to, solid-state memories, optical and magnetic media, and carrier wave signals.

The above description is intended to be illustrative and not restrictive. For example, the above-described embodiments (or one or more aspects thereof) may be used in combination with each other. Other embodiments will be apparent to those of skill in the art upon reviewing the above description. The scope of the claims should, therefore be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract is provided to comply with 37 C.F.R. § 1.72(b), which requires that it allow the reader to quickly ascertain the nature of the technical disclosure. It is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What we claim is:

1. A computer-implemented method for information streaming to a user interface, the method comprising:
   receiving, at a network contact center and from the user interface, a notification that an agent is available to be contacted by customers;
   opening a Hypertext Transfer Protocol (HTTP) connection between the user interface and a server of the network contact center;
   keeping the HTTP connection open as a persistent HTTP connection;
   receiving, at the server of the networked contact center, a HTTP request, from the user interface, to stream information to the user interface, the HTTP request specifying that the server push certain types of events upon their arrival at the server;
   receiving, at the server, one or more events, wherein a particular event of the one or more events indicates that a particular customer is seeking contact with an agent;
   pushing the one or more events, including the particular event, to the user interface via the persistent HTTP connection, the one or more events resulting in a change in the user interface without further HTTP requests from the user interface, wherein the change displays a visual indicator of an incoming call from the particular customer, contact information of the particular customer, and enables a rejection button selectable by the agent for rejecting a communication from the particular customer; and
   terminating the persistent HTTP connection after a predetermined period of time and queuing further events while the persistent HTTP connection is terminated.

2. The computer-implemented method of claim 1, wherein the user interface is a web browser.

3. The computer-implemented method of claim 1, wherein the establishing of the persistent connection to the user interface includes communicating of the HTTP request, wherein the certain types of events include receipt of chat messages.

4. The computer-implemented method of claim 1, wherein the receiving of the information includes receiving one or more of the following events: an agent is available, a telephone call arrives, a status of an agent changes, an agent picks up a telephone.

5. The computer-implemented method of claim 1, wherein the change in the user interface includes flashing a telephone icon to provide the visual indication of the incoming call from the particular customer.

6. The computer-implemented method of claim 1, wherein the sending of the one or more events via the persistent HTTP connection includes sending a telephone number and a name of a calling person.

7. A system for information streaming to a user interface, the system comprising:
   communications computer circuitry configured to receive, at a networked contact center, a Hypertext Transfer Protocol (HTTP) request, from the user interface or from an HTTP client, to stream information to the user interface, the user interface being associated with the networked contact center;
   information streaming computer circuitry configured to:
      establish a persistent HTTP connection to the user interface, and
      receive the information, the information including one or more events associated with the networked contact center; and
      terminate the persistent HTTP connection after a predetermined period of time and queue further events while the persistent HTTP connection is terminated; and
   the communications computer circuitry to send the one or more events to the user interface via the persistent HTTP connection, the one or more events resulting in a change in the user interface without further HTTP requests from the user interface, wherein the change displays a visual indicator of an incoming call from a customer, contact information of the customer, and enables a rejection button selectable by an agent for rejecting a communication from the customer.

8. The system of claim 7, wherein the communications computer circuitry is further configured to receive an HTTP request to stream the information to a web browser.

9. The system of claim 7, wherein the information streaming computer circuitry is further configured to establish the persistent HTTP connection to the user interface.

10. The system of claim 7, wherein the information streaming computer circuitry is further configured is to receive one or more of the following events: an agent becomes available, a telephone call arrives, a status of an agent changes, an agent picks up a telephone.

11. The system of claim 7, wherein the visual indicator includes a flashing icon of a telephone to indicate the incoming call from the customer.

12. The system of claim 7, wherein the communications computer circuitry is further configured to send a telephone number and a name of a calling person via the persistent connection.

13. A non-transitory computer-readable medium comprising instructions, which when implemented by one or more processors, perform the following operations:

receive, at a networked contact center, a Hypertext Transfer Protocol (HTTP) request, from a user interface or from an HTTP client, to stream information to the user interface;
establish a persistent HTTP connection to the user interface;
receive the information, the information including one or more events associated with the networked contact center;
send the one or more events to the user interface via the persistent HTTP connection, the one or more events resulting in a change in the user interface without further HTTP requests from the user interface, wherein the change displays a visual indicator of an incoming call from a customer, contact information of the customer, and enables a rejection button selectable by an agent for rejecting a communication from the customer; and
terminate the persistent HTTP connection after a predetermined period of time and queue further events while the persistent HTTP connection is terminated.

14. The non-transitory computer-readable medium of claim 13, wherein the instructions, which when implemented by one or more processors, perform the following operations: receive the HTTP request to stream the information to a web browser.

15. The non-transitory computer-readable medium of claim 13, wherein the instructions, which when implemented by one or more processors, perform the following operations: establish the persistent connection to the user interface.

16. The non-transitory computer-readable medium of claim 13, wherein the instructions, which when implemented by one or more processors, perform the following operations: receive the information including receiving one or more of the following events: an agent is available, a telephone call arrives, a status of an agent changes, an agent picks up a telephone.

17. A computer-implemented apparatus for information streaming to a user interface, said apparatus comprising:
computer circuitry configured to receive, at a networked contact center, a Hypertext Transfer Protocol (HTTP) request, from the user interface or from an HTTP client, to stream information to the user interface;
computer circuitry configured to establish a persistent HTTP connection to the user interface;
computer circuitry configured to receive the information, the information including one or more events associated with the networked contact center;
computer circuitry configured to send the one or more events to the user interface via the persistent HTTP connection, the one or more events resulting in a change in the user interface without further HTTP requests from the user interface, wherein the change displays a visual indicator of an incoming call from a particular customer, contact information of the customer, and enables a rejection button selectable by an agent for rejecting a communication from the customer; and
computer circuitry configured to terminate the persistent HTTP connection after a predetermined period of time and queuing further events while the persistent HTTP connection is terminated.

18. The computer-implemented apparatus of claim 17, wherein said apparatus includes computer circuitry configured to display the visual indicator by flashing a telephone icon to indicate the incoming call from the customer.

19. The computer-implemented apparatus of claim 17, wherein the computer circuitry configured to send the one or more events via the persistent HTTP connection includes computer circuitry configured to send a telephone number and a name of a calling person.

* * * * *